Nov. 7, 1961     E. T. VINCENT     3,007,302
COMPOUND TURBINE-DIESEL POWER PLANT
Filed Sept. 30, 1958
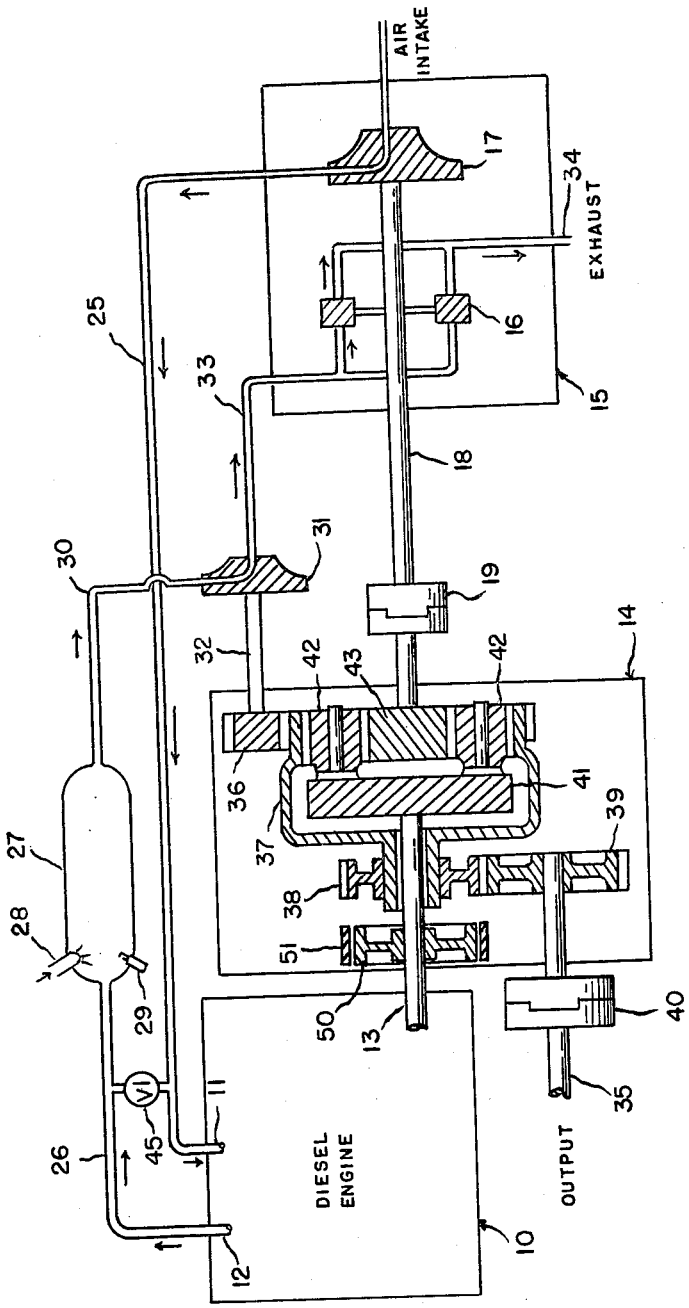
INVENTOR.
EDWARD T. VINCENT
ATTORNEYS 3,007,302
Patented Nov. 7, 1961

3,007,302
COMPOUND TURBINE-DIESEL POWER PLANT
Edward T. Vincent, Ann Arbor, Mich., assignor to Continental Aviation and Engineering Corporation, Detroit, Mich., a corporation of Virginia
Filed Sept. 30, 1958, Ser. No. 764,414
3 Claims. (Cl. 60—13)

My invention relates to compound power plants and more particularly to a combined diesel engine with the high fuel economy at low loads and a gas turbine for emergency full power operation and torque multiplication, while achieving a minimum penalty in fuel consumption.

The high power obtainable with gas turbine engines makes them particularly desirable for applications to militarty vehicles, especially of the track-laying variety. However gas turbine engines consume great quantities of fuel as compared with conventional piston engines. Diesel engines are particularly desirable from the low fuel consumption standpoint, and are very economical under low load operation.

An object of the present invention is to provide an improved compound engine by utilizing a diesel engine up to about half load and then supplying power at higher loads by utilizing a simple gas turbine without regeneration.

A further object of the invention is to achieve successful mating of a gas turbine with a diesel engine by utilizing a gas turbine as a turbocharger for the diesel engine and adding an afterburner in the diesel engine exhaust pipe to provide a means of burning additional fuel as necessary to provide hotter gas to the turbocharger, converting same to a gas turbine for full power and emergency operation.

Another object of the invention is to improve compound engines by coupling a turbine to a diesel engine through an epicyclic gear train, forming a part or the whole of the vehicle transmission, in such a manner that the turbine may be automatically converted from a simple turbocharger for the diesel engine to a gas turbine power plant.

Yet another object of the invention is to improve compound engines by providing a diesel engine with a turbocharger supplying an excess of supercharging air to the engine such that the excess air in the exhaust may be used to burn additional fuel in an afterburner, converting the turbocharger to a gas turbine for full power and emergency operation.

Still a further object of the invention is to simplify compound power plants by providing a diesel engine with a turbocharger operable to be used in starting the diesel engine by converting the turbocharger to a gas turbine.

Still another object of the invention is to simplify engine construction by providing a compound diesel engine-gas turbine system having no engine starter or transmission torque converter.

Yet a further object of the invention is to facilitate the use of lower compression ratios giving lower peak cylinder pressures and lower specific fuel consumption in diesel engines by providing a compound diesel-turbine power plant in which the turbine is optionally operable as a gas turbine starter for quick starting under adverse conditions.

An additional object of the invention is to improve vehicle engine performance by constructing a compound diesel-turbine power plant automatically operable to increase supercharging as the diesel engine stalls.

For a more complete understanding of the invention, reference may be had to the accompanying drawing illustrating in simplified diagrammatic form a preferred embodiment of the invention.

The power plant, as presently conceived and diagrammatically illustrated, comprises a conventional diesel oil engine 10 having an air inlet 11, an exhaust outlet 12, and a drive shaft 13 connected with an epicyclic gear box 14 as will be hereinafter described. A turbo-charger assembly 15 comprises a gas driven turbine 16 and a centrifugal compressor 17 preferably axially mounted on a common shaft 18 which is connected with the epicyclic gear box 14 preferably through a conventional clutch 19.

A pipe or suitable conducting means 25 conducts air from the compressor 17 to the air inlet 11 of the diesel engine 10. The exhaust outlet 12 of the engine is connected by a pipe or any desired means 26 to the inlet side of an after burner 27 having a fuel nozzle 28 supplied from a fuel source (not shown) and an igniter 29. Gas from the afterburner 27 is conducted by a pipe or other means 30 to a turbine 31 drivingly connected by any means such as a shaft 32 to the epicyclic gear box 14, and the gas is then conducted by a pipe or other means 33 to the turbine 16 of the turbocharger 15 and thence to an exhaust 34.

The turbine 31 is directly drivingly connected with the output shaft 35 of the epicyclic gear box 14 through the gear 36, the ring gear 37, the gears 38 and 39, and a transmission clutch 40 as shown. The diesel engine drive shaft has a planet gear carrier 41 which is selectively drivingly connected with the output shaft 35 of the gear box 14 through planet gears 42, the ring gear 37, the gears 38 and 39, and the clutch 40. The drive shaft 13 is also selectively drivingly connected with the turbocharger shaft 18 through the planet carrier 41, the planet gears 42, a gear 43 and the clutch 19. The turbocharger shaft 18 may thus be also selectively drivingly connected with the gearbox output through the gear 43, planet gears 42, ring gear 37, gears 38 and 39, and the clutch 40.

A bypass valve 45 connects the air conducting means 25 with the exhaust gas conducting means 26 upstream of the afterburner 27 for supplying compressed air directly to the afterburner under conditions as will be described.

Generally, the power plant as illustrated comprises the diesel engine 10 to which is geared a turbine and compressor. The turbine is fed by the diesel exhaust gases thus recovering the maximum energy therefrom and adding it to the engine output. It follows that under most operating conditions the recovery from the exhaust gases will more than supply the work absorbed by the compressor, with the result that the specific fuel consumption (S.F.C.) of the engine, turbine and compressor combination will be lower than that of a straight turbocharged engine. At the same time the compressor is geared to the engine, thus improving the acceleration capabilities of the power plant, as compared with a straight turbocharger system. In the case where the exhaust recovery is less than that absorbed by the compressor, the engine only has to supply the difference between the turbine and compressor. The compressor itself is designed to supercharge the engine so that the excess air in the exhaust gases is high, the heat flow to the coolant low, the fuel-air ratio low, with the S.F.C. also low.

However, the exhaust turbine is divided into two units; the turbocharger turbine 16 and the turbine 31, in order to obtain high torque multiplications, high speed operation of the turbocharger under stall conditions, and reasonably good S.F.C. under stall conditions.

The turbine 31, it is noted, is disposed upstream of the turbocharger turbine 16, and is geared directly to the output shaft 35 of the gear box 14 connected for example to vehicle wheels or tracks (not shown). When the wheels or tracks stall, the turbine 31 also stalls since it is in fixed gear ratio to the ring gear 37 and can only rotate if the vehicle moves. Being upstream of the turbocharger turbine, the gas flowing through the turbine, when stalled, still contains its energy, except for small losses. This contained energy is then available to the turbocharger turbine 16 returning some power to the engine shaft instead of expelling it through the exhaust pipe 34 which would be the case with a conventional arrangement having the turbine 31 downstream of the turbocharger turbine 16. The present arrangement thus tends to maintain good S.F.C. under otherwise adverse conditions.

In the afterburner 27, additional fuel may be supplied and burned in the excess air contained in the exhaust gases discharged from the diesel engine 10. By any suitable means, the fuel supply to the nozzle 28 can be regulated to a maximum value which will produce a gas temperature equal to that for which the turbines 31 and 16 are adapted.

The epicyclic gear box 14, connecting the engine 10, the turbine 31, and the turbocharger 15, forms part or all of the transmission of the vehicle.

The bypass valve 45, permitting compressed air to flow directly from the compressor 17 to the afterburner 27 when desired, provides a means for selectively augmenting air flow to the free turbine 31, and also, if desired, will permit the turbine 31 and the turbocharger 15 to function as a power plant completely separate and independent of the diesel engine 10, by utilizing the afterburner 27 as a primary combustion chamber when the clutch 19 is disengaged.

It will be understood that the epicyclic gear box 14, and the driving gear trains shown and described previously, are diagrammatic only, and it may be desirable to integrate the turbine 31 and the turbocharger 15 into a single casing. Other arrangements of course are possible and will be apparent to one skilled in the art.

Briefly, following the directional flow arrows of the drawing, it is seen that air enters the compressor 17, and is delivered to the diesel engine 10 via the conducting means 25. Exhaust gases discharged through the conducting means 26 flow to the afterburner 27, where fuel may or may not be added, pass through the conducting means 30 to the turbine 31, then through the conducting means 33 to the turbocharger turbine 16, and then exhaust through the pipe 34. In addition, the bypass valve 45 short circuits the engine 10 when desired.

More particularly operation of the present power plant is as follows:

1. STARTING

The bypass valve 45 is fully opened so that the inlet of the afterburner 27 communicates directly with the air intake through the conducting means 25. The transmission clutch 40 is released as is the clutch 19 if used, and fuel is injected and ignited in the afterburner 27, the exhaust gases thereof flowing to the turbocharger 15 which operates as a gas turbine capable of developing relatively high horsepower.

By setting the vehicle brakes and engaging the clutches 40 and 19, gears 38 and 39, and ring gear 37 are immobilized, and the turbocharger horsepower is applied to the engine 10 for starting through the sun gear 43 and planet gears 42. The temperature of the inlet air to the engine 10 will be raised to an effectively high value by the compressor 17, and the engine 10 can be cranked for as long as is necessary for firing to be established without any impairment of starting conditions. Even extreme cold starting is possible in a very short period with diesel engines having relatively low compression ratios. It is well known that low compression ratios, within reason develop maximum power and minimum S.F.C. in a diesel engine provided it can be started satisfactorily.

With the diesel engine 10 running under its own power, fuel to the nozzle 28 is shut off, the valve 45 is closed, the diesel engine 10 operates as a compound engine and is ready for operation.

2. MODERATE OUTPUT

With the diesel engine 10 in operation, its power can be varied from idle up to full speed and full power. At full speed, the turbocharger 15 will also be at normal full speed supplying high supercharge to the engine 10. The diesel engine exhaust manifold pressure is designed to be somewhat lower that the air intake pressure so that effective scavenging and blow-through occurs, but at the same time the two turbines 31 and 16 extract the maximum power from the gases, thus restoring to the cycle more than that required to drive the compressor 17. This is the scheme of operation for all conditions up to the point where the diesel engine 10 reaches full power and speed, behaving as a compound diesel engine.

If the resistance to motion of the vehicle increases beyond this point and the afterburner is not operating, the diesel engine speed remaining the same through use of a governor, it follows that the turbine 31 will slow down but the turbocharger 15 will speed up due to the increase in available energy thereto. As a result of these changes, the turbine 31 will increase the torque which it applies to the output shaft as a result of its slow speed, while the turbocharger 15 will increase the air flow through the engine 10 and thus its power output, which will also result in further increase of torque to the turbine 31 and thus to the transmission.

Movement of the engine throttle by hand or governor to increase the power available under these conditions operates through any suitable means to automatically supply and ignite fuel in the afterburner 27, increasing the exhaust gas temperature and the power output of the turbines.

3. MAXIMUM OUTPUT

By opening the bypass valve 45, extra air can be fed directly to the afterburner 27 from the compressor 17. The compressor speed is such that the flow rate can be increased under this condition and still maintain a satisfactory, although slightly lower, efficiency of compression. It follows that by opening the bypass valve 45 to achieve the required rate of flow to the turbines, power output will increase but the work of compression is also increased. But by burning additional fuel in the afterburner 27 to maintain optimum gas temperature, the turbines will deliver sufficient extra horsepower over and above that absorbed in the compressor 17 to give a net increase in power of about 35% or moreover the gross output of the diesel engine 10 alone, but without an abnormal increase in S.F.C. and without the problems of a regenerated gas turbine.

Again under these emergency power conditions, any stalling automatically brings on an increase of speed of the turbocharger 15 and an increase of torque from the free turbine 31 as previously described.

4. PART LOAD OPERATION

With the throttle closed and the vehicle under downhill conditions, the diesel engine friction plus the compressor power absorption is available as a brake. Other braking of the engine if desired, as by the use of a brake 50 and brake band 51, will cause the compressor speed to increase as previously described and to absorb more power in delivering air.

Thus, from all the foregoing considerations, it is seen that the present power plant arrangement provides superior operating characteristics, permitting the coupling of reciprocating and turbine machinery without abnormal increases in S.F.C. without using a regenerated gas turbine. Specific weight and volume of the power plant is good compared to a reciprocating engine with its torque converter transmission which the present power plant replaces.

Moreover, diesel engine economy is available from idling up to full power, with only some minor increase in fuel consumption beyond this range. Also, the system provides a method by which cold starting problems inherent in diesel engines are greatly simplified if not completely eliminated. The present arrangement can also give adequate power for normal operation and emergency power quickly without penalizing normal low power fuel economy, while through the use of the epicyclic gear a high torque multiplication can be achieved by using the turbine 31 upstream of the turbocharger.

Other advantages are that the turbines do not consume fuel at any time unless emergency power is required as has heretofore been the case, and since the compressor is gear driven from the diesel engine as well as being turbine driven, the torque and acceleration characteristics are improved over a straight turbocharged engine of similar output.

Although I have described only one preferred embodiment of the invention, it will be apparent to one skilled in the art to which the invention pertains that various changes and modifications may be made therein without departing from the spirit of the invention or the scope of the appended claims.

I claim:

1. A compound power plant comprising a diesel engine, a turbocharger, means conducting air under pressure from said turbocharger to said engine for supercharging same, means conducting exhaust gas from said engine to said turbocharger for driving same, an afterburner disposed in said exhaust gas conducting means and selectively operable to increase the temperature of the exhaust gas for full power and emergency operation of said turbocharger, means selectively connecting said air conducting means with said exhaust gas conducting means intermediate the engine and afterburner, a turbine disposed in said exhaust gas conducting means intermediate said afterburner and said turbocharger, a torque transmission unit having a driven output element and a plurality of driving elements, said turbine being connected to one of said driving elements and same being drivingly connected at all times with said driven output element, said turbocharger being connected to a second of said driving elements, said engine being connected to a third of said driving elements, said third driving element carrying planet gears, said second and third driving elements being drivingly connected with each other and with said driven output element through said planet gears.

2. The power plant as defined in claim 1, and in which said torque transmission unit comprises an epicyclic gear mechanism having a ring gear, a sun gear and said planetary gears being engaged with said ring and sun gears, said ring gear comprising said driven output element and being drivingly connected at all times with the first driving element, said sun gear comprising said second driving element and being drivingly connected at all times with said third driving element and said driven output element by said planet gears.

3. The power plant as defined in claim 2, and in which said second driving element includes a clutch for selectively disconnecting said turbocharger from said epicyclic gear mechanism.

References Cited in the file of this patent

UNITED STATES PATENTS

| | | |
|---|---|---|
| 1,849,170 | Buchi | Mar. 15, 1932 |
| 2,375,006 | Larrecq | May 1, 1945 |
| 2,379,455 | Prince | July 3, 1945 |
| 2,468,157 | Barlow et al. | Apr. 26, 1949 |
| 2,580,591 | Pouit | Jan. 1, 1952 |
| 2,585,029 | Nettel | Feb. 12, 1952 |
| 2,585,968 | Schneider | Feb. 19, 1952 |
| 2,608,051 | Nettel | Aug. 26, 1952 |
| 2,848,866 | Geislinger | Aug. 26, 1958 |

FOREIGN PATENTS

| | | |
|---|---|---|
| 859,863 | Germany | Dec. 18, 1952 |